W. JACOBUS.
NUT LOCK.
APPLICATION FILED OCT. 16, 1908.
927,466.
Patented July 6, 1909.
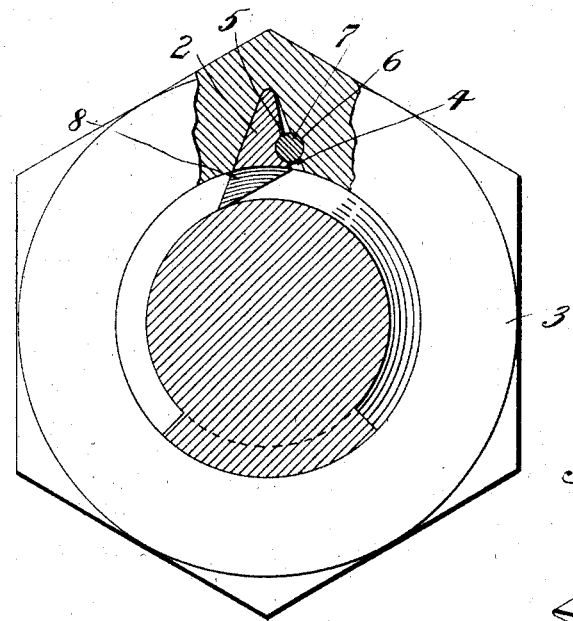
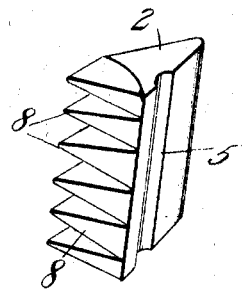
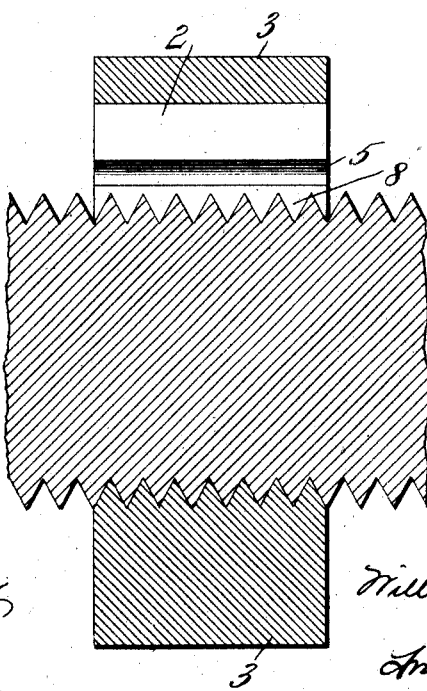
WITNESSES
INVENTOR
William Jacobus
BY
ATTORNEYS

UNITED STATES PATENT OFFICE.

WILLIAM JACOBUS, OF PATERSON, NEW JERSEY.

NUT-LOCK.

No. 927,466.   Specification of Letters Patent.   Patented July 6, 1909.

Application filed October 16, 1908. Serial No. 458,054.

*To all whom it may concern:*

Be it known that I, WILLIAM JACOBUS, a citizen of the United States, and a resident of Paterson, in the county of Passaic and State of New Jersey, have invented certain new and useful Improvements in Nut-Locks, of which the following is a specification.

This invention relates to improvements in nut locks.

In the drawings:—Figure 1 is a plan view of a nut and bolt having applied thereto this invention. Fig. 2 is a vertical section of the construction shown in Fig. 1. Fig. 3 is a detail view in isometrical perspective of the locking member.

The object which this invention has most particularly in view is to provide a nut lock, which will serve efficiently as a lock, and which may also be readily placed in the position in which the locking member is thrown out of engagement, and in which position the nut may be shipped with the locking member in position.

The locking member consists of the V-shaped piece, 2. To receive the locking member, 2, the nut, 3, is provided with a corresponding V-shaped recess, 4. The spread end of the V-shaped recess is larger than the spread end of the locking member, 2. The contracted end of the locking member, 2, rests in the contracted end of the recess, 4. In the side of the locking member, 2, and extending lengthwise thereof is a half-round groove, 5. The side of the V-shaped recess, 4, is likewise provided with a half-round groove, 6. These grooves are placed the one opposite the other, and are designed to receive the pin, 7. When this pin is driven between the wall of the recess, 4, and the wall of the locking member, 2, and into the grooves, 5 and 6, the effect is to force the member, 2, against the opposite wall of the recess, and to retain it in that position. The pin, 7, will also prevent the said member from falling out of the recess, 4. If the pin, 7, is made of soft material it may be easily enlarged by swaging from either the top or bottom. Also, for the purpose of shipment, the ends of the pin, 7, may be slightly riveted. This riveting would be sufficient to prevent the pin, 7, from falling out of the grooves, 5 and 6, and out of the recess, 4, but not such as to prevent the pin being driven out by using a suitable nail or small steel rod.

The spread end of the V-shaped member, 2, is provided with segmental threads, 8, of the same pitch as is the nut. The segmental threads, 8, are formed to the same curve as the thread in the nut, when the locking member, 2, is held in the position shown in Fig. 1. The position shown in Fig. 1 is what is termed the unlocked position, and in this the threads in the locking member, 2, register perfectly with the threads of the nut. The thread of the nut matches in pitch and height the thread of the bolt, on which it is to be screwed. The top of the thread of the bolt, therefore, rides in the bottom of the thread of the nut, and also in the bottom of the thread of the locking member, 2. The thread of the locking member, 2, is cut away from the locking edge of the member as shown. This cut is optional, but preferred by me for the reason that there is avoided the friction on the sides of the threads where they lift out of engagement in action, which friction might hold the member, 2 in line and prevent its rocking to lock; or retard the rocking action.

As long as the pin, 7, is retained in position as is shown in Fig. 1, the member, 2, remains on the bolt as a part of the inner wall of the nut. When, however, the pin, 7, is withdrawn, then any movement of the nut or bolt in the reverse, or unscrewing, direction immediately causes the locking member, 2, to rock on the sharp or contracted end thereof. The length of the side, 8, of the locking member, 2, is longer than the dimension taken on a line through the center of the contracted end of the member, 2, and the center of the bolt, and where the said line passes through the member, 2. Therefore in rocking as stated the longer dimension acts to jam the edge of the side, 8, into the crown and sides of the thread on the bolt, and by so doing to arrest the movement of the bolt or nut in the unlocking direction. This engagement of the side, 8, is with the entire edge of the segmental threads. That is on the crown and sides and bottom of the thread.

When a nut provided with a locking member constructed as herein described has been screwed on to a bolt, it may be withdrawn readily and easily by driving a pin, 7, or a nail, or even a wedge of wood between the grooves, 5 and 6, thereby forcing the locking member, 2, into the unlocked position, as shown in Fig. 1. When the locking member, 2 is in this position the nut may be readily unscrewed, the pin, 7, preventing the member, 2, from rocking.

Having thus described this invention it is claimed.

1. A nut lock comprising a V-shaped locking member the spread end of which is shaped to the curve of the bolt and threaded to register therewith, said member being provided in the side with a vertical groove; a nut having a V-shaped recess the spread end of which is larger than the spread end of the said locking member; and having a vertical groove formed in the side wall to register with the said groove in the locking member.

2. A nut lock comprising a triangular locking member adapted to pivot on one of the angles of the triangle and having segmental threads formed in one side of the triangle said threads being formed to the curve of the nut carrying the locking member; a nut adapted to be screwed on a bolt and having a recess to hold the said locking member; and a groove formed in the abutted faces of the nut and the side of the said locking member, said grooves adapted to hold a key to release the locking member.

Signed at New York in the county of New York and State of New York this 12th day of October A. D. 1908.

WILLIAM JACOBUS.

Witnesses:
E. F. MURDOCK,
DANIEL DEV. HARNED.